United States Patent [19]

Grychtol

[11] Patent Number: 4,663,441

[45] Date of Patent: May 5, 1987

[54] ASYMMETRIC 1:2 CHROME COMPLEX DYE OF A PHENYLAZOSULPHONAPHTHOLAMINE AND A NAPHTHOLAZOSULPHONAPHTHOL

[75] Inventor: Klaus Grychtol, Bad Durkheim, Fed. Rep. of Germany

[73] Assignee: BASF Aktiengesellschaft, Ludwigshafen, Fed. Rep. of Germany

[21] Appl. No.: 776,459

[22] Filed: Sep. 16, 1985

[30] Foreign Application Priority Data

Sep. 15, 1984 [DE] Fed. Rep. of Germany ....... 3433951

[51] Int. Cl.$^4$ ...................... C09B 45/06; C09B 45/16; D06P 1/10; D06P 3/24
[52] U.S. Cl. ................... 534/696; 534/693; 534/697; 534/700; 534/712; 534/722; 534/723; 534/724; 534/828
[58] Field of Search ................ 534/693, 696, 697, 699

[56] References Cited

U.S. PATENT DOCUMENTS

| | | | |
|---|---|---|---|
| 3,516,979 | 6/1970 | Dore et al. | 534/696 |
| 3,522,231 | 7/1970 | Bitterlin | 534/696 |
| 3,544,546 | 12/1970 | Crabtree et al. | 534/696 X |
| 4,416,815 | 11/1983 | Schutz et al. | 534/696 X |
| 4,432,898 | 2/1984 | Back et al. | 534/696 X |

FOREIGN PATENT DOCUMENTS 43-824 1/1968 Japan .................... 534/696

OTHER PUBLICATIONS

Chemical Abstracts, Band 86, Nr. 14, Apr. 4, 1977, Seite 47, Nr. 90848k, Columbus, Ohio, US.

Primary Examiner—Floyd D. Higel
Attorney, Agent, or Firm—Oblon, Fisher, Spivak, McClelland & Maier

[57] ABSTRACT

Compounds of the formula I

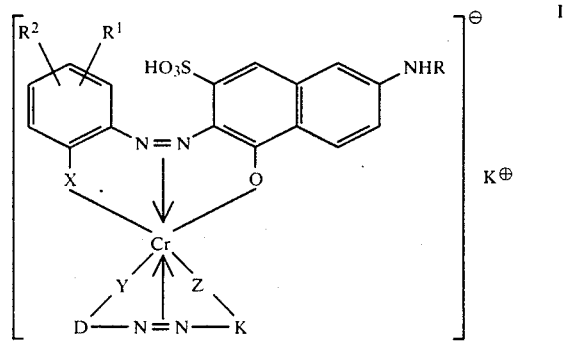

where $K^\oplus$ is a cation, R is methyl or is phenyl which is unsubstituted or substituted by chlorine, bromine, methyl, methoxy or ethoxy, $R^1$ is hydrogen, chlorine, bromine or nitro, $R^2$ is hydrogen, chlorine, bromine, nitro, sulfamyl or hydroxysulfonyl, X and Y are each —O— or —COO—, Z is —O— or —NH—, D is a radical of a diazo component of the aniline or naphthylamine series and K is a radical of a coupling component, are very useful for dyeing natural and synthetic polyamide textile fibers and leather.

1 Claim, No Drawings

ASYMMETRIC 1:2 CHROME COMPLEX DYE OF A PHENYLAZOSULPHONAPHTHOLAMINE AND A NAPHTHOLAZOSULPHONAPHTHOL

The present invention relates to compounds of the general formula I

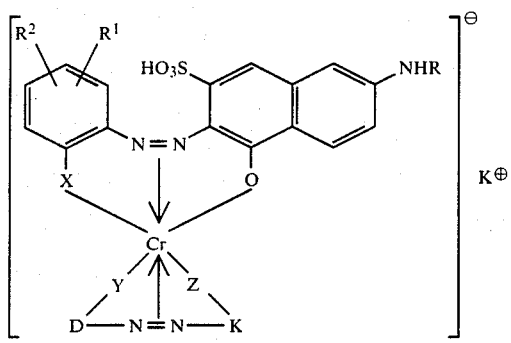

where $K^\oplus$ is a cation, R is methyl or is phenyl which is unsubstituted or substituted by chlorine, bromine, methyl, methoxy or ethoxy, $R^1$ is hydrogen, chlorine, bromine or nitro, $R^2$ is hydrogen, chlorine, bromine, nitro, sulfamyl or hydroxysulfonyl, X and Y are each —O— or —COO—, Z is —O— or —NH—, D is a radical of a diazo component of the aniline or naphthylamine series and K is a radical of a coupling component.

Examples of cations $K^\oplus$ are $H^\oplus$, $Li^\oplus$, $Na^\oplus$, $K^\oplus$ and unsubstituted or substituted ammonium ions, specific examples of which are $NH_4^\oplus$, $^\oplus NH_3CH_2CH_2OH$, $H_2N^\oplus(CH_2CH_2OH)_2$, $^\oplus NH(CH_2CH_2OH)_3$,

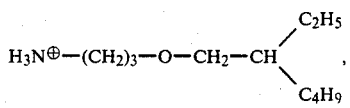

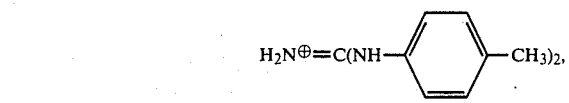

$HN^\oplus(C_{13}H_{27})_3$ and $H_3N^\oplus C_{12}H_{25}$.

The diazo components $DNH_2$ can, for example, initially be substituted by fluorine, chlorine, bromine, methyl, ethyl, methoxy, ethoxy, nitro, methylsulfonyl, unsubstituted or substituted sulfamyl or hydroxysulfonyl, examples of unsubstituted or substituted sulfamyl radicals being $SO_2NH_2$, $SO_2NHCH_3$, $SO_2N(CH_3)_2$, $SO_2NHC_2H_5$, $SO_2NHC_4H_9$ and $SO_2NHC_6H_5$.

Specific examples of preferred diazo components are 2-aminophenol, 4-chloro-2-aminophenol, 4- or 5-nitro-2-aminophenol, 4,6-dichloro-2-aminophenol, 4,6-dinitro-2-aminophenol, 4-methyl-6-nitro-2-aminophenol, 4-chloro-5-nitro-2-aminoanisole, 4,5-dichloro-2-aminoahisole, 2-aminobenzoic acid, 4-nitro-2-aminobenzoic acid, 2-aminophenol-4-sulfonic acid, 2-aminophenol-4-sulfonamide, 2-aminophenol-4-sulfonic acid methylamide, 2-aminophenol-4-sulfonic acid phenylamide, 4-chloro-2-aminophenol-6-sulfonic acid, 4-chloro-2-aminoanisole-5-sulfonic acid methylamide, 4-nitro-2-aminophenol-6-sulfonic acid, 6-nitro-2-aminophenol-4-sulfonic acid, 5-nitro-2-aminoanisole-4-sulfonic acid, 1-amino-2-naphthol-4-sulfonic acid, 1-amino-6-nitro-2-naphthol-4-sulfonic acid, 2-amino-1-naphthol-5-sulfonic acid and 2-amino-4- or 5-sulfobenzoic acid.

The coupling components KH are predominantly derived from the benzene, naphthalene, pyrazolone, acetoacetarylide or pyridone series and can carry as substituents, for example, methyl, ethyl, methoxy, ethoxy, acetylamino, benzoylamino, hydroxyl, amino or hydroxysulfonyl.

Specific examples of compounds KH are 4-methylphenol, 3,4-dimethylphenol, 4-acetylaminophenol, 4-methyl-3-acetylaminophenol, 3-diethylaminophenol, 4-methyl-3-ethylaminophenol, 3-(o-tolylamino)-phenol, 2-naphthylamine, 2-naphthol, 6-bromo-2-naphthol, 5,8-dichloro-1-naphthol, 1-naphthol-2-sulfonic acid, 2-naphthol-6-sulfonic acid, 1-naphthylamine-4- or -5-sulfonic acid, 2-naphthylamine-5- or -6-sulfonic acid, 8-acetylamino-1-naphthol-5-sulfonic acid, 6-phenylamino-1-naphthol-3-sulfonic acid, 7-amino-1-naphthol-3-sulfonic acid, 3-methylpyrazol-5-one, 1-phenyl-3-methylpyrazol-5-one, 1,3-diphenylpyrazol-5-one, 1-phenylcarbethoxypyrazol-5-one, 1-(2'-methylphenyl)-3-methylpyrazol-5-one, 1-(4'-chlorophenyl)-3-methylpyrazol-5-one, 1-(2',5'-dichlorophenyl)-3-methylpyrazol-5-one, 1-phenyl-3-methylpyrazol-5-one-4'-carboxylic acid, 1-phenyl-3-methylpyrazol-5-one-3'- or -4'-sulfonic acid, 1,3-diphenylpyrazol-5-one-2'-sulfonic acid, 1-(2'-chlorophenyl)-3-methylpyrazol-5-one-5'-sulfonic acid, 2,4-dihydroxyquinoline, N-acetoacetylcyclohexylamide, N-acetoacetylphenylamide and N-acetoacetyl-(2-sulfo)phenylamide.

The compounds of the formula I can be prepared by, for example, subjecting a 1:1 chrome complex of the formula

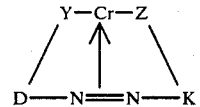

to an addition reaction with a compound of the formula

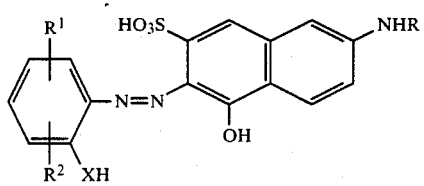

by a conventional method.

The Examples which follow illustrate the preparation. Parts and percentages are by weight, unless stated otherwise.

The compounds of the formula I are useful for dyeing natural and synthetic polyamides, in particular wool and nylon. In the form of the long-chain ammonium salts, they can also be used as dyes for printing inks, for pastes for ballpoint pens and for inks.

On textiles, red to black hues are obtained, some of which possess very good fastness properties, the fastness to milling being particularly noteworthy.

Of particular importance are compounds in which R is phenyl, $R^1$ is H or $NO_2$, $R^2$ is $NO_2$, X, Y and Z are each —O—, D is naphthylene or phenylene which is substituted by $NO_2$ and/or sulfo, and K is unsubstituted or hydroxysulfonyl-substituted 1,2-naphthylene, 1-arylpyrazolonyl (where aryl is unsubstituted or substituted by chlorine, methyl, methoxy or hydroxysulfonyl), or acetoacetaryl which is unsubstituted or substituted by chlorine, bromine, methoxy or methyl.

EXAMPLES

EXAMPLE 1

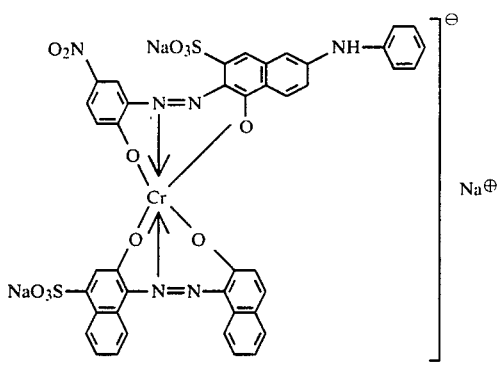

278 parts of 4-nitro-2-aminophenol are stirred in 1,800 parts of water, and dissolved with 720 parts of dilute hydrochloric acid. 1,300 parts of ice are added, and 544 parts by volume of 3.3 N sodium nitrite solution are run in over 15 minutes. Stirring is continued for 10 minutes in the presence of a slight excess of nitrite, after which the excess is destroyed with a little amidosulfonic acid. The diazo suspension is then run, in the course of 20 minutes, into a coupling solution of 578 parts of phenyl I acid in 3,600 parts of water, 400 parts of ice and 160 parts of NaOH (calculated as 100%). Coupling is complete after 30 minutes. The pH is brought to 7.5 with 72 parts by volume of dilute hydrochloric acid, and the suspension of the azo dye is diluted with 6,000 parts of water.

The press cake of the 1:1 Cr complex consisting of 94 parts of chromium and 692 parts of the monoazo dye obtained from diazotized 1-amino-2-hydroxynaphthalene-4-sulfonic acid and 2-hydroxynaphthalene is then added, the mixture is heated to 90° C. and the pH is kept at 7.5-8 by the dropwise addition of dilute sodium hydroxide solution. The solution is filtered to clarify it, and the dye is then isolated by spray drying. 2,350 parts of a black powder are obtained. The dye dyes polyamide-containing materials in navy hues having very good fastness properties. The fastness to milling is noteworthy, reaching the level of afterchrome dyes.

Dyes having similar properties are obtained by the same process, using the 1:1 complexes below.

| Example | 1:1-Cr-complex of | Hue on wool |
|---|---|---|
| 2 | (structure) | black |
| 3 | (structure) | blue |
| 4 | (structure) | black |
| 5 | (structure) | blue |
| 6 | (structure) | greenish black |
| 7 | (structure) | violet |
| 8 | (structure) | violet blue |
| 9 | (structure) | brown |
| 10 | (structure) | black |
| 11 | (structure) | greyish blue |
| 12 | (structure) | greyish blue |

-continued

| Example | 1:1-Cr-complex of | Hue on wool |
|---|---|---|
| 13 | 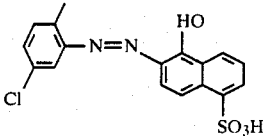 | black |
| 14 | 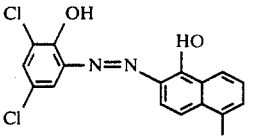 | black |

EXAMPLE 15

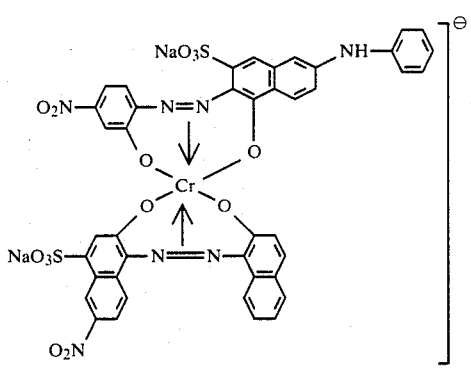

77 parts of 5-nitro-2-aminophenol are stirred with 500 parts of water, 250 parts of ice and 200 parts of hydrochloric acid. Diazotization is carried out by adding 150 parts by volume of 3.3 N sodium nitrite solution at from 5° to 7° C. The mixture is stirred for one hour, after which a small excess of nitrite is destroyed with amidosulfonic acid. The diazo suspension is run into a solution of 170 parts of phenyl I acid in 1500 parts of water and 65 parts by volume of 50% strength sodium hydroxide solution, the temperature of the solution being kept at 10° C. by adding ice. Coupling is complete after a short time, and the pH is brought to 7-7.5 with dilute hydrochloric acid. The press cake of the 1:1 Cr complex consisting of 26 parts of chromium and 220 parts of the monoazo dye obtained from diazotized 1-amino-2-hydroxy-6-nitronaphthalene-4-sulfonic acid and 2-hydroxynaphthalene is then added. The mixture is diluted with 1,000 parts of water and heated to 90° C., and a pH of 8-8.5 is maintained at this temperature by adding dilute sodium hydroxide solution. The addition reaction is complete within one hour. The solution is filtered to clarify it, and the dye is then isolated by evaporating down the solution. 600 parts of a black electrolyte-containing powder are obtained.

Wool, nylon and leather are dyed in black hues having good fastness properties.

Dyes having similar properties are obtained by subjecting the 1:1 complexes in the table below to the addition reaction:

| Example | 1:1-Cr-complex of | Hue on wool |
|---|---|---|
| 16 | 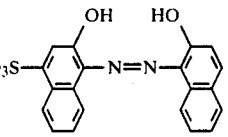 | blue |
| 17 | 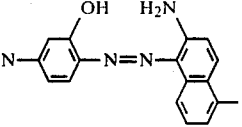 | greenish black |
| 18 | 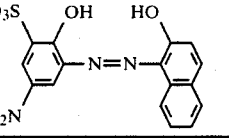 | black |

EXAMPLE 19

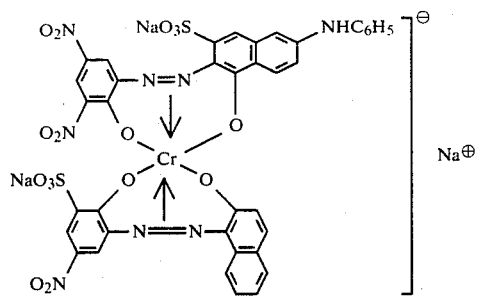

19.9 parts of 4,6-dinitro-2-aminophenol in 100 parts of water and ice are cooled to 5° C., 10 parts by volume of dilute hydrochloric acid are added, diazotization is effected in a conventional manner with 30 parts by volume of sodium nitrite solution, and the product is then coupled with 85 parts of phenyl-I acid in the manner described. Coupling takes place very rapidly at pH 9. The suspension of the azo dye is heated to 80° C., and the press cake of the 1:1 Cr complex consisting of 5.2 parts of chromium and 39 parts of the azo dye obtained from diazotized 4-nitro-2-aminophenol-6-sulfonic acid and 2-hydroxynaphthalene is added. The mixture is stirred for 3 hours at 80°-90° C., and the pH is kept at 8.0 by adding dilute sodium hydroxide solution. The asymmetric 1:2 metal complex is salted out from the hot solution with 300 parts of sodium chloride and is isolated by filtering it off under suction. When the product has been dried, 180 parts of a black powder are obtained.

Black dyeings having very good fastness properties are obtained on natural and synthetic polyamides.

Similar dyes are obtained using the components shown in the tables below.

| Example | Azo dye | 1:1-Cr-complex of | Hue on wool |
|---|---|---|---|
| 20 | | (naphthalene with OH, HO3S, N=N, naphthol with OH) | black |
| 21 | | (naphthalene with OH, HO3S, O2N, N=N, naphthol with OH) | black |
| 22 | | (O2N-phenol-OH, N=N, naphthalene with H2N, SO3H) | greenish black |
| 23 | | (O2N-phenol-OH, N=N, pyrazolone with HO, N-phenyl-SO3H, H3C) | brown |
| 24 | (CH3O, Cl, OCH3-phenyl-N=N-naphthalene with HO3S, HO, NH-C6H5) | (naphthalene OH, HO3S, N=N, naphthol OH) | blue |
| 25 | (O2N-phenol-OH, N=N, naphthalene with HO3S, NH-C6H5) | (CO2H-phenyl-N=N, pyrazolone HO, N-phenyl-SO3H, H3C) | green |
| 26 | (O2N-phenol-OH, N=N, naphthalene with HO3S, NH-C6H5, HO) | (O2N-phenol-OH, N=N, pyrazolone HO, N-phenyl-SO3H, H3C) | greyish blue |
| 27 | (HO3S-phenol-OH, N=N, naphthalene with HO3S, NH-C6H5, HO) | (O2N, HO3S-naphthalene-OH, N=N, naphthol-OH) | blue |
| 28 | (HO3S-phenol-OH, N=N, naphthalene with HO3S, NH-C6H5, HO) | (HO3S-naphthalene-OH, N=N, naphthalene) | blue |
| 29 | (HO3S-phenol-OH, N=N, naphthalene with HO3S, NH-C6H5, HO) | (O2N-phenyl-HO3S-OH, N=N, naphthol-OH) | reddish blue |

-continued
| Example | Azo dye | 1:1-Cr-complex of | Hue on wool |
|---|---|---|---|
| 30 | 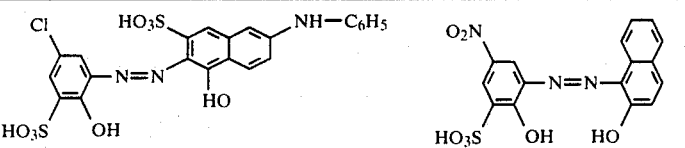 | 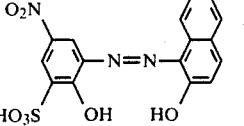 | greyish blue |
| 31 | 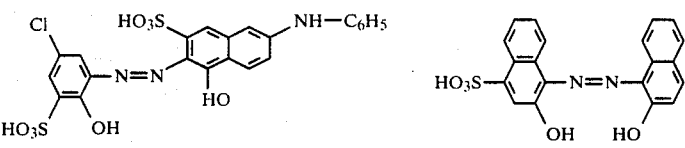 | 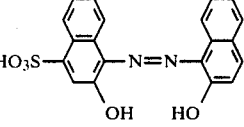 | blue |
| 32 | 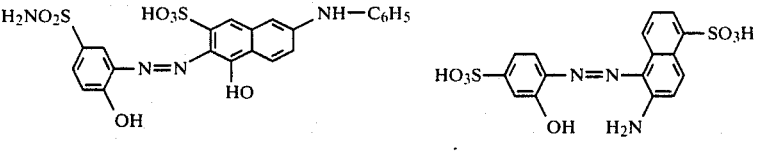 | 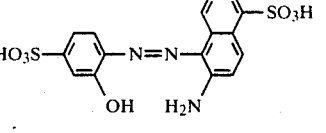 | blue |
| 33 | 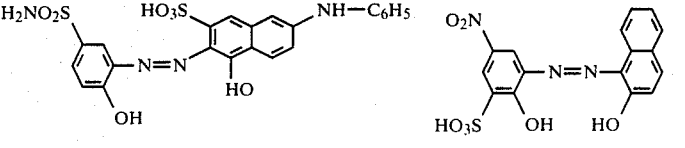 | 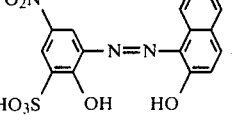 | greyish blue |
| 34 | 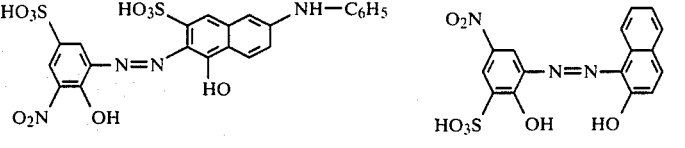 | 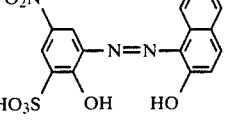 | black |
| 35 | 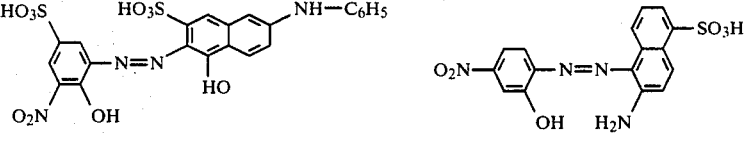 | 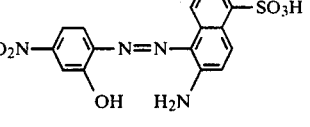 | dark blue |
| 36 | 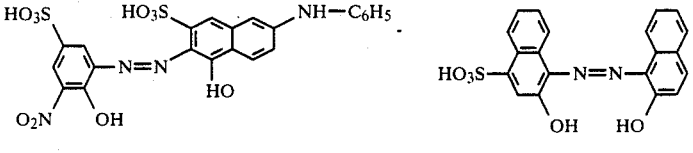 | 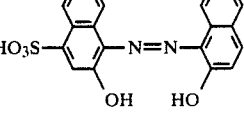 | blue |
| 37 | 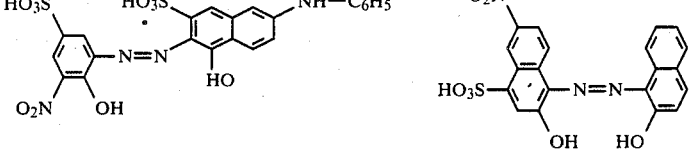 | 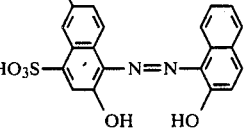 | black |
| 38 | 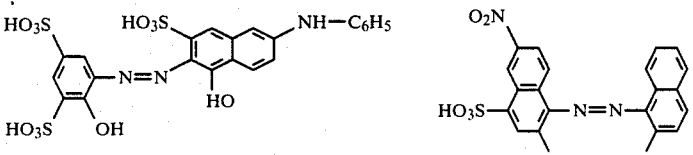 | 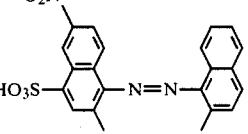 | black |
| 39 | 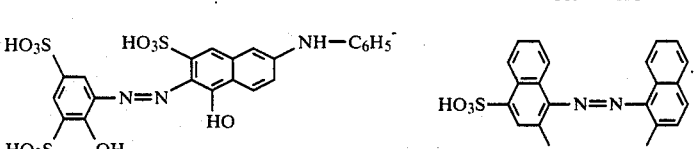 | 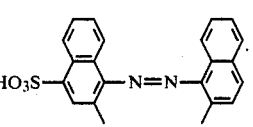 | blue |

-continued

| Example | Azo dye | 1:1-Cr-complex of | Hue on wool |
|---|---|---|---|
| 40 | HO$_3$S, HO$_3$S, NH—C$_6$H$_5$ naphthalene with N=N, OH, HO, HO$_3$S | O$_2$N — N=N — naphthalene-SO$_3$H, OH, HO | blue |
| 41 | HO$_3$S, HO$_3$S, NH—C$_6$H$_5$ naphthalene with N=N, OH, HO, HO$_3$S | O$_2$N — N=N — naphthalene, HO$_3$S, OH, HO | greyish blue |
| 42 | HO$_3$S, NH—C$_6$H$_5$ naphthalene with N=N, OH, CO$_2$H | O$_2$N — N=N — naphthalene, HO$_3$S, OH, HO | violet brown |

We claim:
1. A compound of the formula

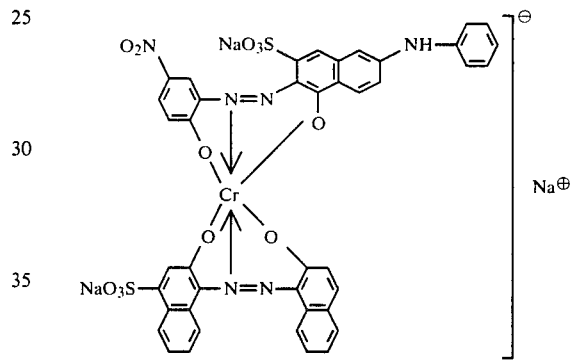

* * * * *